United States Patent [19]  
Yaoita

[11] Patent Number: 5,746,171  
[45] Date of Patent: May 5, 1998

[54] DIRECT FUEL INJECTION STRATIFIED CHARGE ENGINE

[76] Inventor: Yasuhito Yaoita, Wellstone Terrace 2, 12-32 Nagahama, Kanazawa-ku, Yokohama, 236, Japan

[21] Appl. No.: 740,503

[22] Filed: Oct. 30, 1996

Related U.S. Application Data

[63] Continuation-in-part of Ser. No. 383,844, Feb. 6, 1995, Pat. No. 5,605,125.

[51] Int. Cl.$^6$ .................................................. F02B 3/00
[52] U.S. Cl. .......................... 123/275; 123/298; 123/661
[58] Field of Search ................................ 123/260, 261, 123/275, 298, 531

[56] References Cited

FOREIGN PATENT DOCUMENTS

| | | | |
|---|---|---|---|
| 3148165 | 10/1982 | German Dem. Rep. | 123/260 |
| 76115 | 12/1932 | Sweden | 123/260 |
| 768520 | 2/1957 | United Kingdom | 123/260 |

OTHER PUBLICATIONS

Satoshi Kato and Shigeru Onishi, 'Nainen kikan'(Internal Combustion Engines), Tokyo, Sankai-dō Publishing, Jul. 1988, pp. 35 to 44, "Stratified Charge Engine by Impingement of Fuel Jet (OSKA)".

Satoshi Kato and Shigeru Onishi, SAE (Society of Automotive Engineers) Paper No. 871689, 1987, "New Mixture Formation Technology of Direct Fuel Stratified Combustion SI Engine (OSKA)".

The Institute of Vocational Training, Pro. Dr. Eiichi Watanabe, The trade journal 'Nainen kikan' (Internal Combustion Engines), Tokyo, Sankai–dō Publishing, Jan. 1988 P73–82, "Some Impression in Australia (1)".

Primary Examiner—Noah P. Kamen

[57] ABSTRACT

A Stratified Charge Engine where the main combustion chamber is made into one part of the cylinder head is described. The main combustion chamber in this engine is smaller than in Pre-Mixture Combustion Engines. Other main features of this engines are direct and simultaneous air/fuel injection, installation of a squish area and prevention of combustion in the end-gas zone. The thermal load and the weight of the piston in this engine are lower than in normal Stratified Charge Engines with fuel jet impingement. The fuel jet is kept inside the main combustion chamber, resulting in an higher anti-knocking quality of this engine as compared to Pre-Mixture Combustion Engines.

3 Claims, 7 Drawing Sheets

DIRECT FUEL INJECTION STRATIFIED CHARGE ENGINE

CROSS-REFERENCE TO RELATED APPLICATION

This is a continuation in part application of Ser. No. 08-383844 filed on Feb. 6, 1995, now U.S. Pat. No. 5,605,125.

BACKGROUND OF THE INVENTION

1. Field of the Invention

The present invention relates to the increase in the anti-knocking quality of Stratified Charge Engines by the use of a main combustion chamber with dimensions smaller than the diameter of the cylinder, direct fuel injection, installation of a squish area and prevention of combustion in the end-gas zone. In particular, the present invention relates to the reduction of the weight and the thermal load of the piston, the reduction of the thermal load of the protruding electrodes of a spark plug.

2. Description of the Related Art

In 'Nainen kikan' (Internal Combustion Engines, Tokyo, Sankai-dô Publishing), July 1988, page 35 to 38, a 'Stratified Charge Engine by Impingement of Fuel Jet' is discussed (hereafter "Stratified Charge Engine by Impingement of Fuel Jet", both two-cycle and four-cycle types, will be abbreviated as OSKA).

SAE paper-871689 discloses almost the same engine as the aforementioned one (OSKA).

Figure 5:
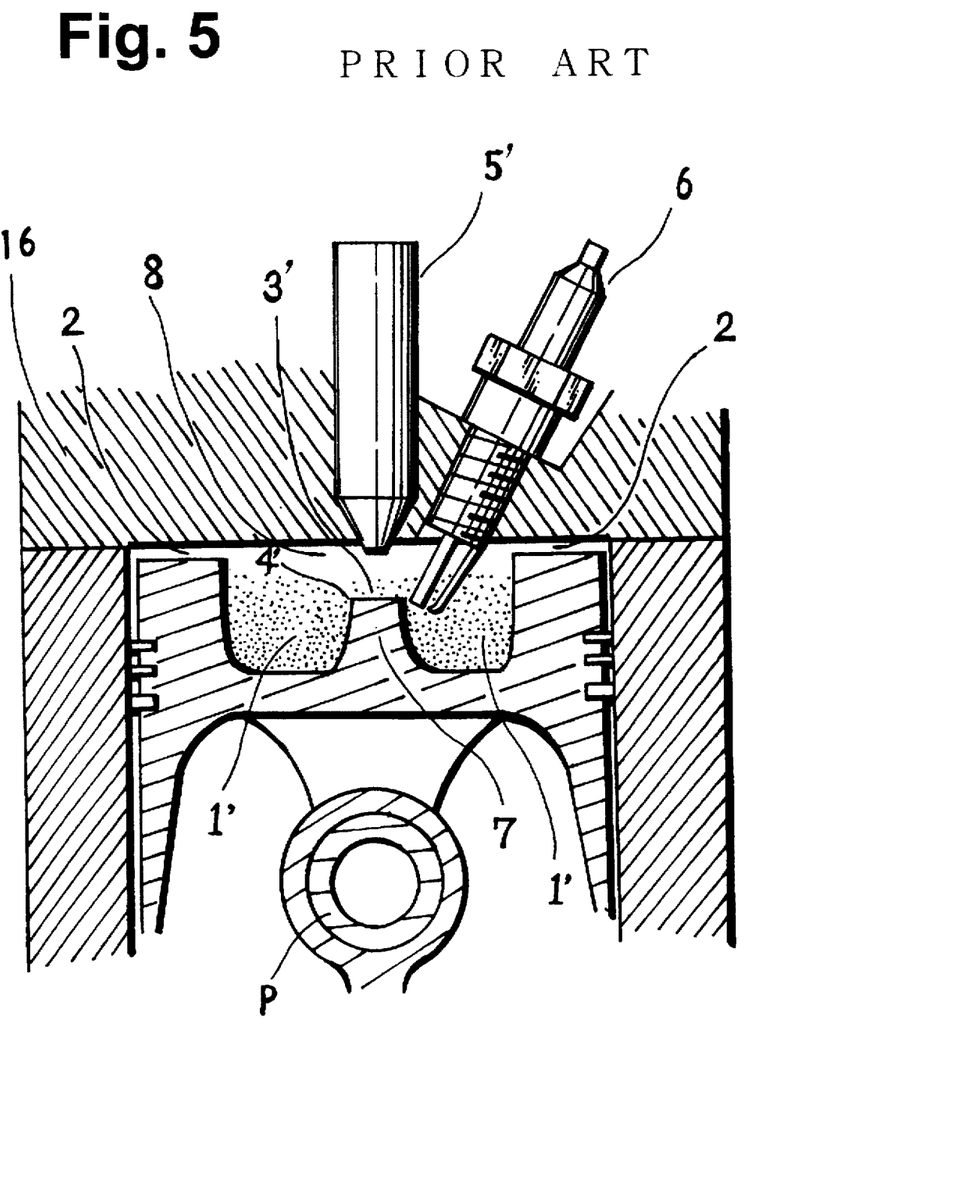
FIG. 5 is a cross sectional view explaining the construction and the working of OSKA at ignition.

Construction and working at ignition of OSKA are depicted and explained in FIG. 5.

In OSKA, during the compression stroke an injector 5' injects fuel towards an impingement surface 3', installed inside the main combustion chamber 1'. The fuel jet after impingement is scattered and directed into the main combustion chamber 1' to improve the diffusibility of the fuel jet. As a result, the squish flow causes a mixture layer—marked by dot—to be created only inside the main combustion chamber 1' at ignition.

In OSKA, the mixture washed into the squish area 2 at combustion stroke is rarefied, so that combustion in the end-gas zone, where knocking is developed easily, becomes impossible.

Accordingly, anti-knocking is higher in OSKA than in Pre-Mixture Combustion Engines, where fuel is delivered into the inside of the inlet valve.

However, concerning OSKA the following four problems do exist:

(1) As the main combustion chamber in OSKA is made as a deep cavity 1' into the top of the piston, the top surface of the piston in contact with the hot combustion gas is increased, and the thermal load of the piston is higher than in Pre-Mixture Combustion Engines.

In OSKA, the whole of the edge 4' of the impinging surface 3' protrudes and accordingly, the thermal load of the impinging part is increased.

(2) The piston in OSKA is similar to the piston of Direct Fuel Injection Diesel Engines and accordingly longer and heavier than the piston of Pre-Mixture Combustion Engines.

(3) Additionally, at the end of the combustion stroke, a squish flow consisting of air is developed along the squish area 2'. Therefore, between the inner wall of the combustion chamber at the cylinder head 16', and the mixture layer inside the main combustion chamber 1', an incombustible lean mixture layer 8', is formed.

If the spark plug could be installed into the side wall of the main combustion chamber 1' at the top of the piston, then a normal spark plug electrode could be installed at the mixture layer. However, in this case, exchange of the spark plug is fairly difficult. Therefore, in OSKA, the spark plug 6' is installed at the cylinder head 16 near the injector 5'. The electrode of the spark plug 6' protrudes into the mixture layers inside the main combustion chamber 1'. Accordingly, the thermal load of the spark plug electrode is increased.

(4) Additionally, as the impinging part is projecting into the main combustion chamber 1', the construction of the combustion chamber in OSKA is complicated.

Besides this, there are other methods of improving the diffusibility of fuel jet.

Figure 6:
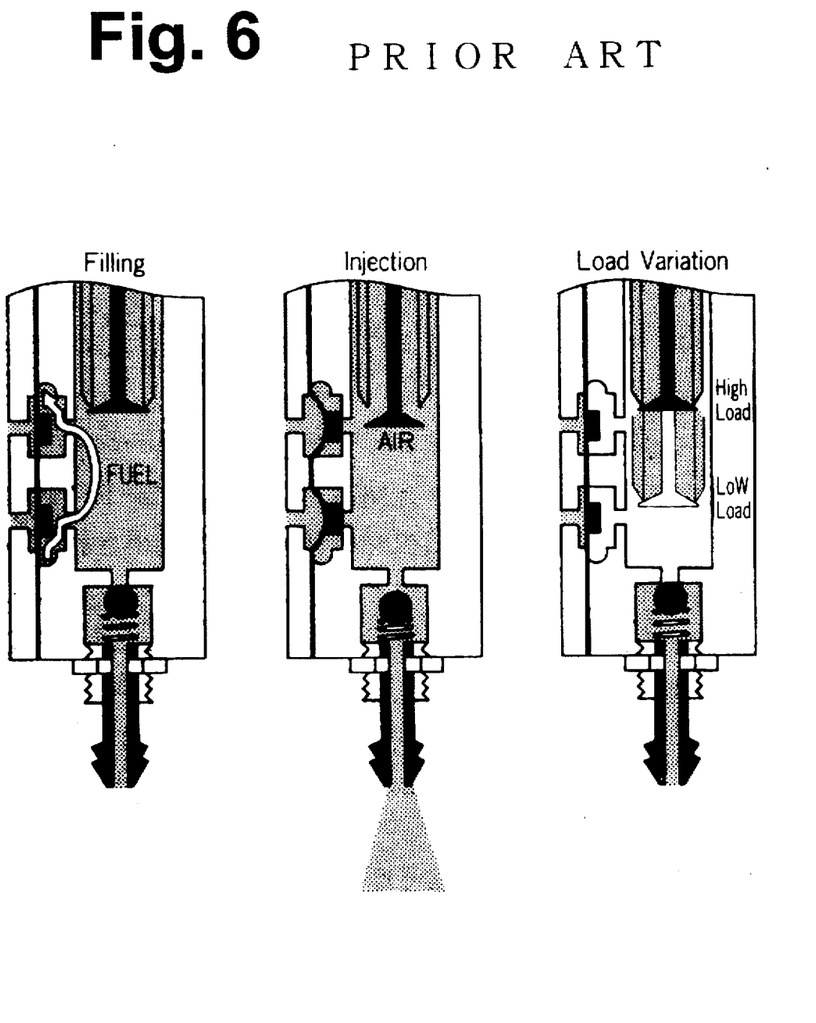
FIG. 6 are drawings showing the motion of Orbital Fuel Injection System, which injects fuel and air simultaneously.
Figure 7:
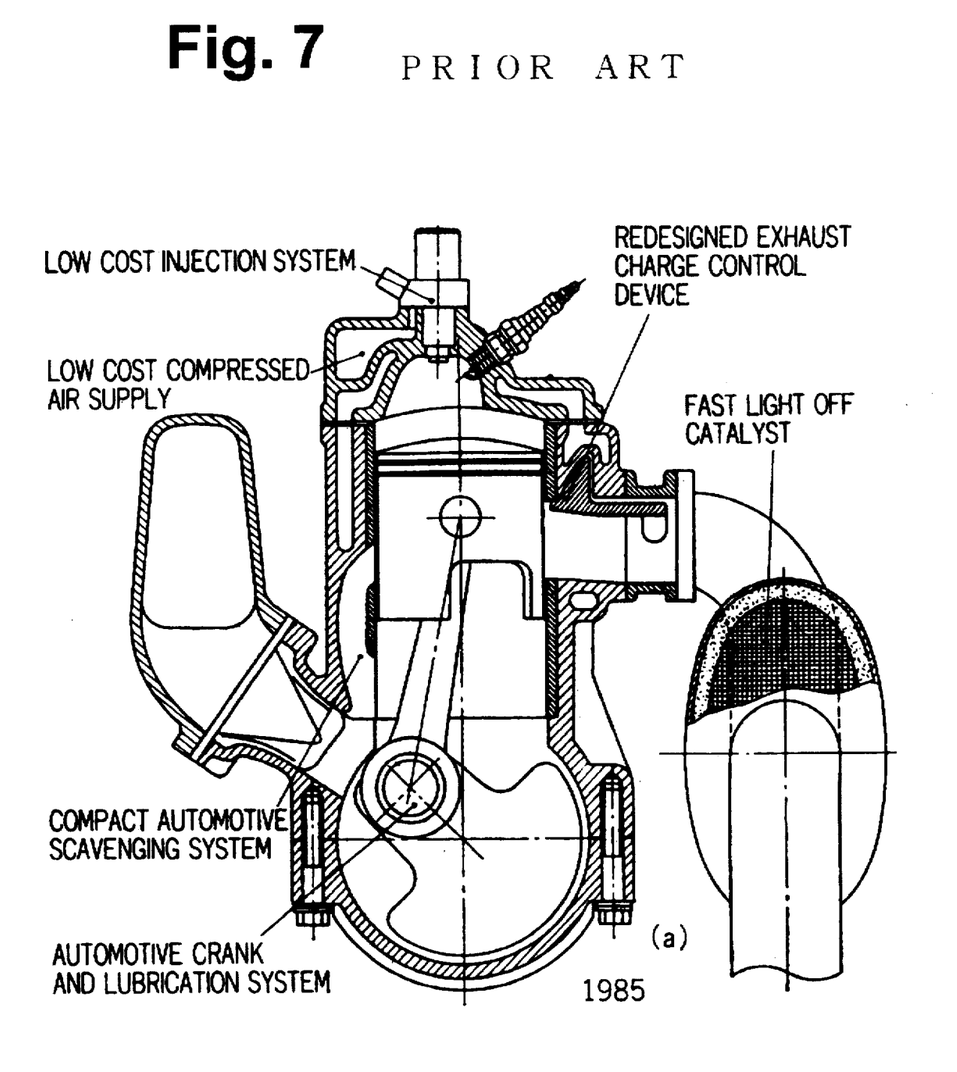
FIG. 7 is a cross sectional view explaining the construction of Orbital Combustion Process Engine.

FIGS. 6 and 7, which are disclosed in Pages 75 and 79 of the Japanese trade journal, "Nainen Kikan" (Internal Combustion Engine), Tokyo, Sankai-dô Publishing, July 1988, illustrate an injector of Orbital Co., Ltd., which injects fuel and air simultaneously.

With the fuel injector, compressed air causes fuel to be scattered, resulting in improved diffusibility of the fuel jet. However, the fuel injector shown in FIG. 7 is mounted so as to direct to the lower portion in the cylinder to provide mixture to overall space in the cylinder.

SUMMARY OF THE INVENTION

The purpose of this invention, a Stratified Charge Engine with a main combustion chamber with dimensions smaller than the diameter of the cylinder is to achieve a higher anti-knocking quality than in Pre-Mixture Combustion Engines through the following four goals:

(1) construction without impingement part where thermal load increases;

(2) lighter construction of the piston than in OSKA;

(3) reduction of thermal load of the electrode of the spark plug as compared with OSKA; and (4) simpler construction of the combustion chamber than in OSKA.

BRIEF DESCRIPTIONS OF THE DRAWINGS

Other features and advantages of the invention will be apparent from the following descriptions, taken in connection with the accompanying drawings, wherein:

FIGS. 5 to 7 shows prior art.

DETAILED DESCRIPTION OF THE PREFERRED EMBODIMENTS

The present invention is a Stratified Charge Engine with a small main combustion chamber. Other main features of this engine are direct fuel injection, installation of a squish area, and prevention of combustion in the end-gas zone. The use of direct fuel injection as well as by the installation of a squish area 2 and the use of the squish flow in this engine allows layer formation to be restricted only to the inside of the main combustion chamber 1. The formation of fuel layers with high diffusibility only inside the main combustion chamber 1 can be realized by a modified main combustion chamber and use of a suitable diffusion process, both of which differ considerably from OSKA. The various embodiments of the present invention represent exemplars of Stratified Charge Engines with a main combustion chamber in the cylinder head and a diffusion process different from OSKA.

Figure 1:
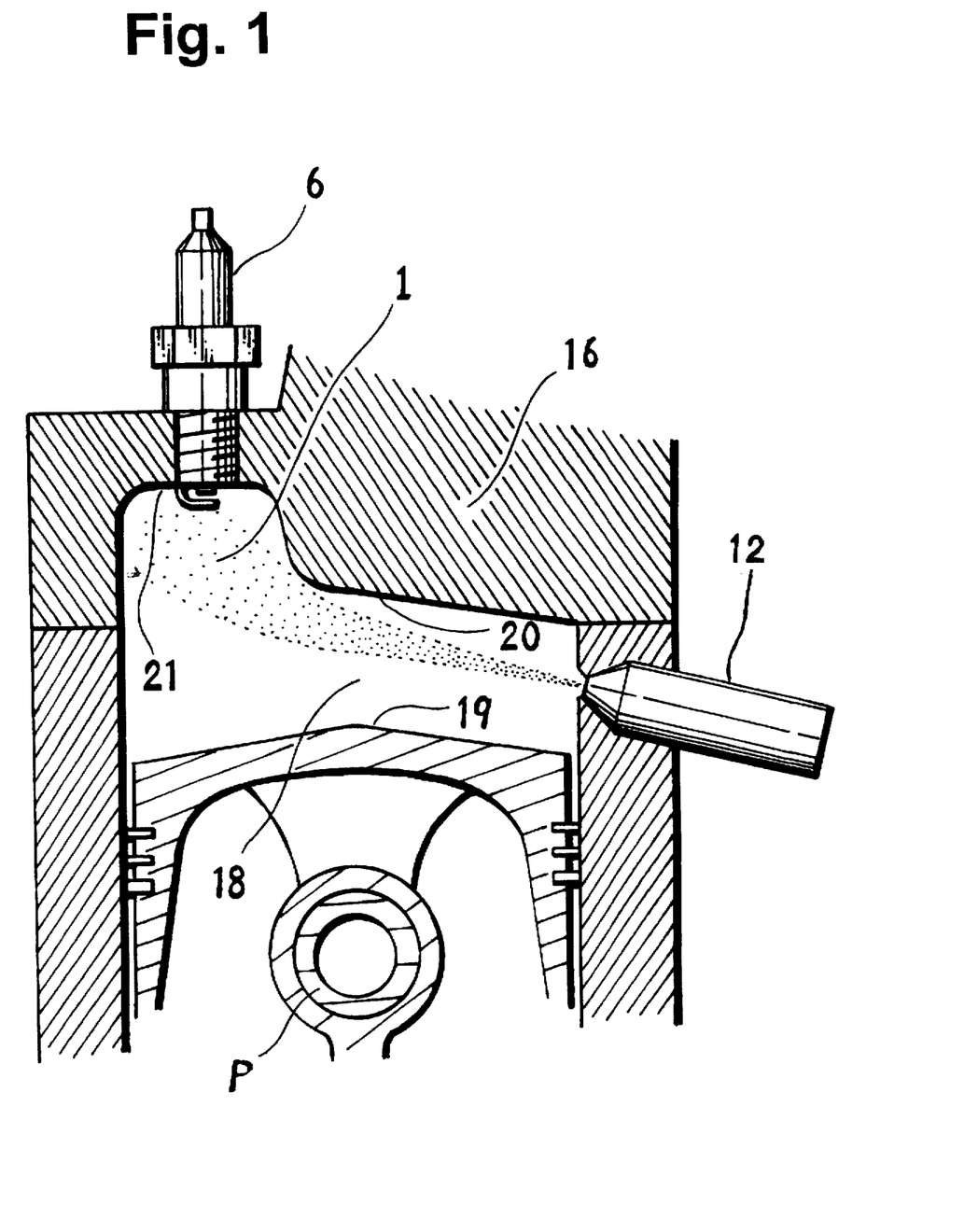
FIG. 1 is a cross sectional view of a preferred embodiment during fuel injection, where air and fuel are injected at the same time.
Figure 2:
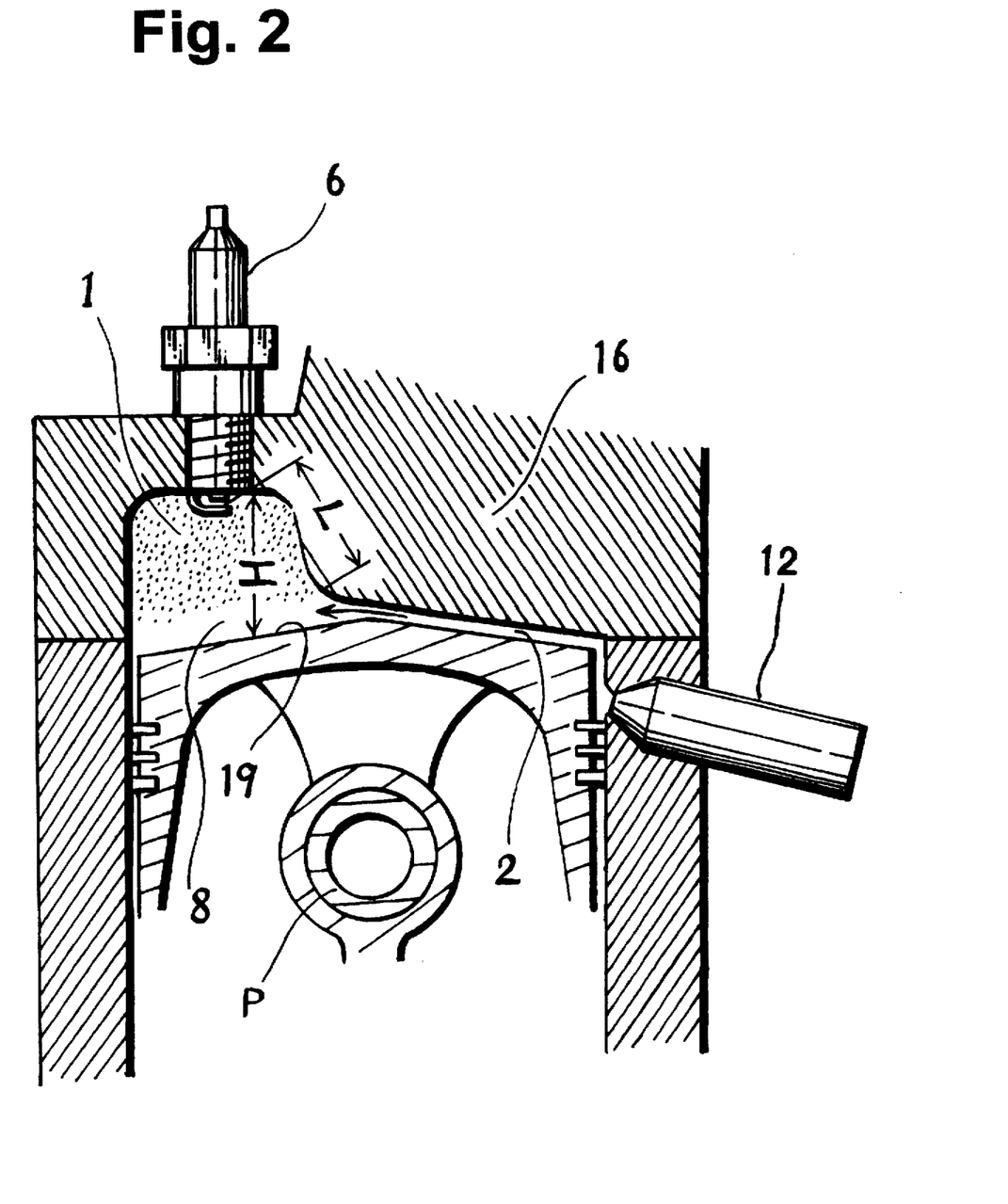
FIG. 2 is a cross sectional view of a preferred embodiment of FIG. 1 immediately before ignition.

FIG. 1 shows a cross sectional view of a Spark Ignited Internal Combustion Engine in the vicinity of the combustion chamber at fuel injection. FIG. 2 is a cross sectional view of the same preferred embodiment immediately before ignition.

The main combustion chamber 1 is located between one part of the inner wall of the cylinder head 16 and the top 19 of the piston at the end of the compression stroke. The squish area 2 is situated on another part 20 of the inner wall of the cylinder head 16. The form of the piston's top is optional. If the piston's top 19 is planar, the opposing inner wall 20 at the cylinder head 16 at the squish area 2 has to be formed accordingly.

An injector 12 is installed at an inner wall of the upper part of the cylinder. An injector 12 injects fuel and air at the same time. Fuel injection at full load takes place during the compression stroke. As an example of an injector 12 where fuel and air are injected simultaneously, the injector produced by Orbital Engines CO. (Australia) can be used.

No fuel impingement is used.

FIG. 2 shows a spark plug 6 with a normal electrode is installed at the top 21 of the main combustion chamber 1, which is in contact with the mixture layer (marked with dots) at ignition.

The size of the main combustion chamber 1 is smaller than the radius of the cylinder. Particularly, in the case of a single spark plug, the distance L between the furthest part of the inner wall of the main combustion chamber 1 and the electrode of the spark plug 6 is smaller than the cylinders radius. The height H of the main combustion chamber has to be adjusted so that the size of the main combustion chamber is suitable for a compression ratio with no knocking development.

The preferred embodiment of FIG. 1, a Stratified Charge Engine, can be either a 2-cycle type without overhead valves, or else a 2-cycle type or a 4-cycle type with overhead valves. In the latter case, the overhead valves 15 can either be installed outside the main combustion chamber 1, as shown in FIG. 1, or inside the main combustion chamber.

Simultaneously injecting air and fuel allows an uneven dispersion of the fuel inside the upper part of the cylinder to concentrate around the main combustion chamber 1. An air layer forms inside the cylinder below the fuel layer. Immediately before ignition, the size of the squish area 2 is narrowed, and the squish flow (marked with an arrow) develops along the inner wall facing the squish area in the direction of the combustion chamber 1, as shown in FIG. 2. Through the ascent of the piston, the unevenly dispersed fuel jet inside the cylinder near the main combustion chamber 1 flows easily into the main combustion chamber 1.

At ignition, an incombustible lean mixture layer 8 is formed between the squish area 2 and the lower part of the main combustion chamber 1. Therefore, by the working of the squish flow and by churning, mixture formation at ignition is restricted to the inside of the main combustion chamber 1.

The distance between the various parts of the inner walls of the combustion chamber 1 and the closest electrode of the spark plug 6, is smaller than the radius of the cylinder. Therefore, the time needed for the combustion of the mixture layer in the main combustion chamber 1 in FIG. 2 is shorter than the combustion time of the mixture inside the whole cylinder at ignition. Accordingly, the anti knocking quality of the preferred embodiment of FIG. 1 and FIG. 2 (and OSKA) is higher than in Pre-Mixture Combustion Engines. As high compression ratios are realized, fuel costs are reduced.

The pressure in the main combustion chamber 1 is increasing during the combustion stroke and part of the fuel layer is spread into the squish area 2. Knocking develops most easily in end gas zone. However, combustion in the end-gas zone is impossible, as the mixture is rarefied by the air around the squish area.

As no deep main combustion chamber is made into the top of the piston, the surface of the piston in contact with burnt gas in the preferred embodiments of FIG. 1 and FIG. 2, is smaller than in OSKA. In other words, the thermal load of the piston can be kept low and reliability is increased.

The main reason for upper speed limits in combustion engines is the weight of moving parts, like valves and pistons, undergoing reciprocating movements. In the present invention, no deep main combustion chamber is made into the pistons top. The part of the piston above the piston's base pin p in the preferred embodiment is lighter than in OSKA.

Maximum output is related to upper limits of rotational speed and associated upper limits for the torque. The upper limit of the torque at high speed rotation is mainly related to limits of the square measure of intake valves.

In the 2-cycle type version of the preferred embodiment without overhead valves, no limit for the installation of inlet valves does exist. Therefore, high speeds become possible and the maximum output of the 2-cycle type version of preferred embodiment is higher than in OSKA.

As the upper part of the piston is smaller in the preferred embodiment than in OSKA, the cylinder and the cylinder block can be constructed smaller and lighter. Also, the reliability of the electrode of the spark plug 6 in this preferred embodiment is higher than in OSKA, because the spark plug electrode is not protruding, as is the case in OSKA.

In Pre-mixture combustion engines, where the fuel Jet is delivered into the intake valves, if kerosene (which has a lower volatility than gasoline) is used, the engine oil at the side wall of the cylinder is diluted. In contrast, in this embodiments, most of the fuel jet vaporizes immediately after the injection. Even if kerosene is used as fuel, the engine oil at the cylinder side wall is neither diluted nor worn away. Gasoline and kerosene, fuels with different octane values, can be properly used according to load.

Figure 3:
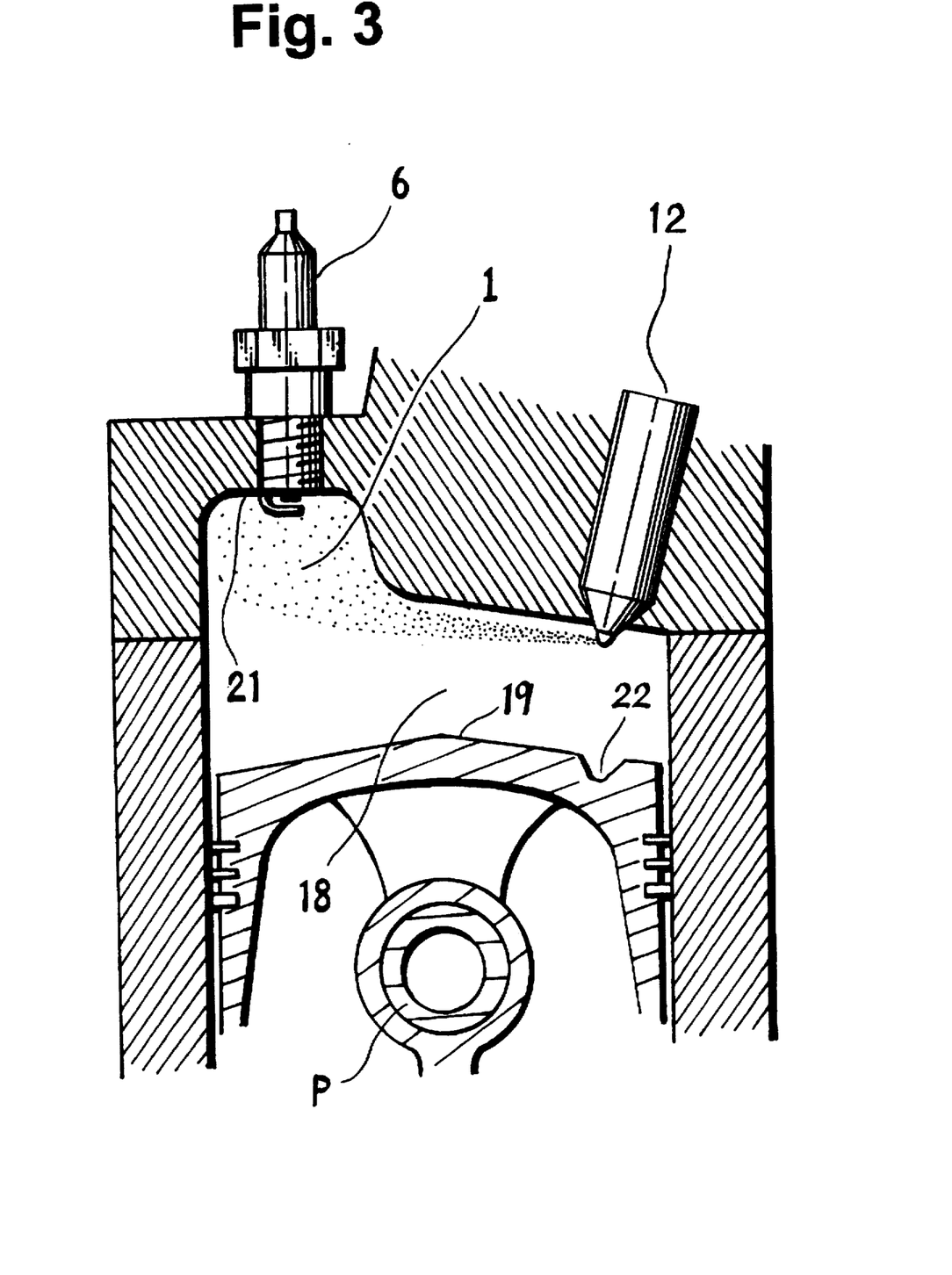
FIG. 3 is a cross sectional view of a preferred embodiment where the fuel injector simultaneously injecting air and fuel is installed on the lower surface of the cylinder head facing the squish area.

As illustrated in FIG. 3, the fuel injector 12 for simultaneously injecting air and fuel is installed on the lower surface of the cylinder head facing the squish area 2 to form mixture only in the main combustion chamber 1, like the embodiment shown in FIG. 1. The tip of the injector 12, with the injection holes, protrudes from the inner wall of the cylinder head. A corresponding cavity 22 has to be made into the top of the piston.

In OSKA, if several combustion chambers are made into the top of the piston, the piston becomes heavier. In the present invention, no similar problem exists. Several main combustion chambers 1 and several spark plugs 6 can be made into the inner wall of the cylinder head 16.

If several main combustion chambers 1 are installed in one cylinder, combustion time is shorter than in the preferred embodiments presented above, because of the smaller volume of the individual main combustion chambers 1. Accordingly, higher compression ratios are realized and anti-knocking quality is increased.

Figure 4:
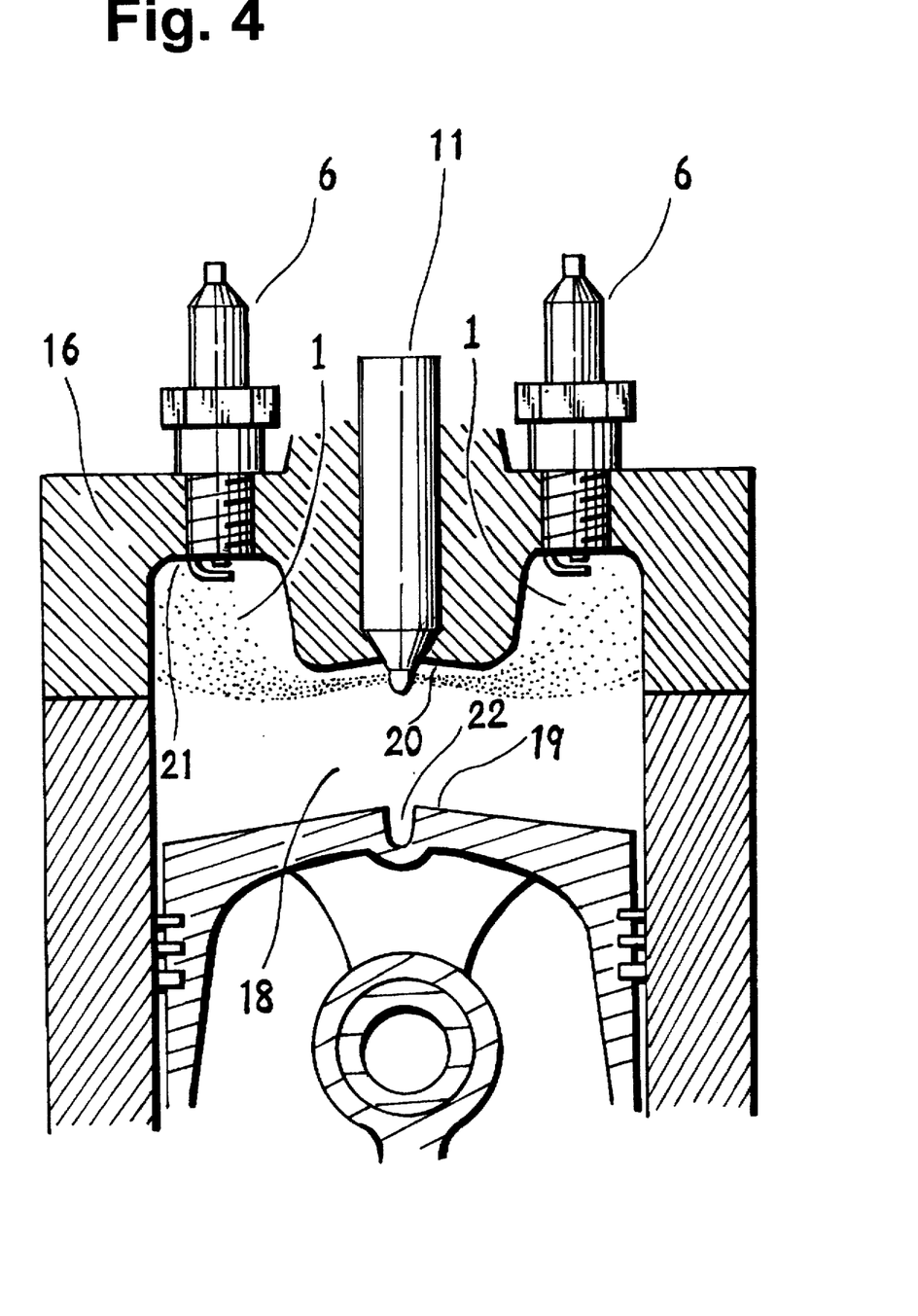
FIG. 4 is a cross sectional view of a preferred embodiment where the multi-hole injector injecting fuel and air at the same time.

A multiple hole injector 11 for simultaneously injecting fuel and air can also be installed at the inner wall 20 of the cylinder head 16, near the main axis of the cylinder, as shown in FIG. 4. The tip of the injector 11, with the injection holes, protrudes from the inner wall of the cylinder head. A corresponding cavity 22 has to be made into the top of the piston. Squish areas are made between the inner wall 20 of the cylinder head and the top 19 of the piston. Squish surfaces are made between said plurality of main combustion chambers.

If the wall 20 of the cylinder head 16 around the multiple hole injector 11 is shaped concavely, no cavity 22 has to made into the top of the piston.

In the present invention, at ignition and under full load condition, the above mentioned layer 8 with a lean air-fuel ratio is located at the bottom of the main combustion chamber 1. The mixture layer is located above this lean mixture layer 8.

If the spark plug 6 is installed at the above mentioned mixture layer, a spark plug with a conventional electrode can be installed at random at one of the inner walls of the main combustion chamber 1 at the cylinder head 16. A spark plug with a protruding electrode is also possible.

If a conventional electrode is used, the thermal load of the electrode of the spathe spark plug 6 can be located lower than in OSKA, where a spark plug with a protruding electrode is used.

Knocking is a phenomenon that develops mainly at full load. In all preferred embodiments discussed above, knocking is prevented by layered combustion at full load condition. At low load, either intake regulation by use of a throttle valve and pre-mixture combustion, or layered combustion are possible.

To realize layered combustion inside the main combustion chamber 1 at low load, the time interval between the beginning of fuel injection and ignition has to be shorter than at full load.

If the electrode of the spark plug 6 is installed at the mixture layer, ignition at minimum load and with small quantities of injected fuel is possible.

What I claim is:

1. A direct fuel injection stratified charge engine comprising:

a cylinder block defining a cylinder;

a piston located in said cylinder;

a cylinder head on said cylinder block, said cylinder head defining a squish surface facing said piston, and a pocket defining a main combustion chamber on a circumferential wall facing said piston;

a spark plug in said pocket, wherein the greatest spacing between electrodes of the spark plug and any portion of said pocket is less than the radius of said cylinder; and a fuel injector located on an inner cylinder wall adjacent said squish surface, said fuel injector located diametrically of said pocket and adapted to simultaneously inject fuel and air without impinging on said squish surface to said pocket during the compression stroke.

2. A direct fuel injection stratified charge engine comprising:

a cylinder block defining a cylinder;

a piston located in said cylinder;

a cylinder head on said cylinder block, said cylinder head defining a plurality of pockets each defining a main combustion chamber and are spaced around the cylinder axis, and a squish surface located between said pockets;

a spark plug in each pocket, wherein the greatest spacing between electrodes of the spark plug and any portion of said pocket is less than the radius of said cylinder; and a multiple hole injector located on said squish surface at the cylinder axis and adapted to simultaneously inject fuel and air without substantially impinging on said squish surface to each pocket during the compression stroke.

3. A direct fuel injection stratified charge engine comprising:

a cylinder block defining a cylinder;

a piston located in said cylinder;

a cylinder head on said cylinder block, said cylinder head defining a squish surface facing said piston, and a pocket defining a main combustion chamber on a circumferential wall facing said piston;

a spark plug in said pocket, wherein the greatest spacing between electrodes of the spark plug and any portion of said pocket is less than the radius of said cylinder; and a fuel injector located on an inner wall of said cylinder head adjacent said center line of said cylinder and adapted to simultaneously inject fuel and air without impinging on said squish surface to said pocket during the compression stroke.

* * * * *